United States Patent
Kostrzewski et al.

(10) Patent No.: US 7,336,299 B2
(45) Date of Patent: Feb. 26, 2008

(54) PANORAMIC VIDEO SYSTEM WITH REAL-TIME DISTORTION-FREE IMAGING

(75) Inventors: Andrew A Kostrzewski, Garden Grove, CA (US); Sookwang Ro, Los Angeles, CA (US); Il'ya Agurok, Long Beach, CA (US); Mark Bennahmias, Redondo Beach, CA (US)

(73) Assignee: Physical Optics Corporation, Torrance, CA (US)

( * ) Notice: Subject to any disclaimer, the term of this patent is extended or adjusted under 35 U.S.C. 154(b) by 680 days.

(21) Appl. No.: 10/758,829

(22) Filed: Jan. 15, 2004

(65) Prior Publication Data

US 2006/0023105 A1   Feb. 2, 2006

Related U.S. Application Data

(60) Provisional application No. 60/485,336, filed on Jul. 3, 2003.

(51) Int. Cl.
*H04N 5/225*   (2006.01)

(52) U.S. Cl. .................................. 348/207.99

(58) Field of Classification Search ................ 348/335, 348/207.99, 143, 333.06, 333.07; 359/727
See application file for complete search history.

(56) References Cited

U.S. PATENT DOCUMENTS

| | | | | |
|---|---|---|---|---|
| 5,854,713 A | * | 12/1998 | Kuroda et al. | ............... 359/850 |
| 5,990,941 A | * | 11/1999 | Jackson et al. | ........ 348/207.99 |
| 6,459,451 B2 | * | 10/2002 | Driscoll et al. | ............. 348/335 |

\* cited by examiner

*Primary Examiner*—Tuan Ho
(74) *Attorney, Agent, or Firm*—Sheppard Mullin Richter & Hampton LLP

(57) ABSTRACT

A panoramic annular lens system (PAL), a unitary video camera and a PC-based software system that unwraps a 360° video image into a seamless, distortion free horizontal image image in real time. The PAL system of the preferred embodiment has a 360° horizontal field of view and a 90° vertical field of view in a 40 mm diameter compact package. The invention is not limited to any particular type of lens system. In fact, there are numerous lens systems for providing a 360° panoramic view. The video camera may be a CCD or CMOS based device having a pixel resolution of either 1280×1024 (high resolution) or 720×480 (NTSC). The unwrapping system is a radiometric ray tracing program carried out using a computer's graphics card capabilities to produce highly efficient regional transformation while minimizing software overhead. The result is real time, high resolution 30 fps conversion from a spherical distorted image to a flat panoramic image in Cartesian coordinates.

19 Claims, 18 Drawing Sheets

PANORAMIC VIDEO SYSTEM WITH REAL-TIME DISTORTION-FREE IMAGING

CROSS-REFERENCE TO RELATED APPLICATIONS

The present invention takes priority from provisional application Ser. No. 60/485,336 filed on Jul. 3, 2003.

ORIGIN OF THE INVENTION

The invention described herein was made in the performance of work under a USMC contract No. M67854-03-C-1006, and is subject to the provisions of public law 96-517 (35 USC 202) in which the contractor has elected to retain title.

FIELD OF THE INVENTION

The present invention relates generally to the field of special video camera systems and more specifically to a real-time 360° panoramic video system which utilizes a panoramic annular mirror, video camera and unique unwrapping software which provides a seamless, distortion-free horizontal view of the panoramic image.

BACKGROUND OF THE INVENTION

Panoramic optical systems which can be employed to provide a 360° field of view, are known. By way of example, U.S. Pat. No. 6,459,451 discloses a catadioptric lens which provides a 360° field of view. Such optical systems can be used advantageously with a camera to provide a system capable of imaging an entire 360° field such as an entire room or landscape from a unitary location using a single camera without requiring scanning or stitching multiple images. However, such lenses provide an image which is not readily interpretable by observers unless the image is first "unwrapped". The image of a 360° field of view lens is annular or doughnut-shaped and is therefore distorted and not readily discernible by a human observer. It is therefore necessary to convert that image or "unwrap" it into a relatively two-dimensional format such as a horizontal view on a relatively flat medium such as physically on film or electronically on a computer screen. The unwrapping process consists of a mathematical transformation such as by conversion of each picture element or pixel and is preferably accomplished in a manner which results in little or no distortion which would otherwise reduce the quality of the resulting flat image. Such pixel-by-pixel transformations are typically very complex and require complicated and time consuming computer programs, especially for reasonable levels of resolution and images having large numbers of pixels. Consequently, it has not been possible heretofore to exploit panoramic lens technology to provide a real-time unwrapped video image with acceptable resolution.

A system which could provide real-time unwrapped video images derived from a panoramic lens and video camera would be highly advantageous for a variety of useful applications. By way of example, such a system could provide security surveillance over a continuous all-around field of view using a unitary display with just one observer. Such a system could also be mounted on a transport mechanism and used for military or police reconnaissance purposes or for robotic imaging. It could also be used for medical visualization and for traffic awareness systems. It can be tailored to be compatible with internet transmission, wireless systems and can be designed for video image compression to reduce transmission bandwidth requirements. Once it becomes convenient to "unwrap" a panoramic video image in real time with little or no distortion and with an acceptable level of resolution, a host of useful and advantageous applications become feasible and readily available.

SUMMARY OF THE INVENTION

The present invention in its preferred embodiment combines a panoramic annular lens system (PAL), a unitary video camera and a PC-based software system that unwraps a 360° video image into a seamless, distortion free horizontal image image in real time. The PAL system comprises two mirrors, namely, a hyperboloidal mirror and an ellipsoidal mirror interconnected by a 360° circular refracting front or entrance aperture lens and having a rear or exit aperture adjacent a collector lens. The PAL system of the preferred embodiment has a 360° horizontal field of view and a 90° vertical field of view in a 40 mm diameter compact package. The invention is not limited to any particular type of lens system. In fact, there are numerous lens systems for providing a 360° panoramic view. The video camera may be a CCD or CMOS based device having a pixel resolution of either 1280×1024 (high resolution) or 720×480 (NTSC). The unwrapping system is a radiometric ray tracing program carried out using a computer's graphics card capabilities to produce highly efficient regional transformation while minimizing software overhead. The result is real time, high resolution 30 fps conversion from a spherical distorted image to a flat panoramic image in Cartesian coordinates. A graphic user interface (GUI) permits selection of any breaking point (any center line of the panoramic image) as well as zoom in and zoom out capability and built-in calibration.

BRIEF DESCRIPTION OF THE DRAWINGS

The various embodiments, features and advances of the present invention will be understood more completely hereinafter as a result of a detailed description thereof in which reference will be made to the following drawings:

FIG. 2, comprising

FIG. 4, comprising

FIG. 16, comprising

FIG. 17, comprising

FIG. 23, comprising

DETAILED DESCRIPTION OF PREFERRED EMBODIMENTS

Panoramic Annular Lens (PAL)

Figure 1:
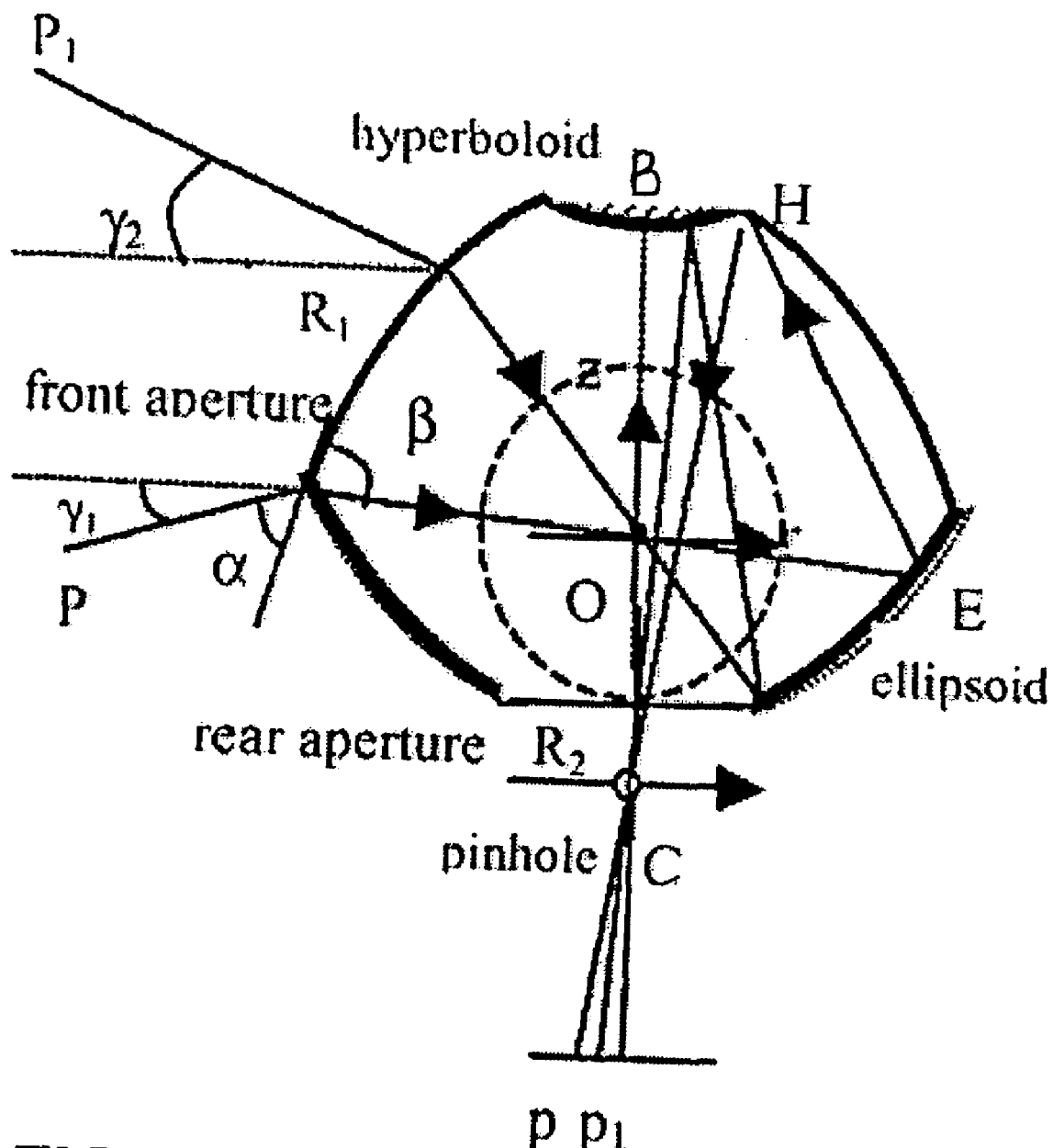
FIG. 1 is a schematic diagram of a panoramic annular lens structure which may be employed in the present invention.

The PAL lens is based on both reflection and refraction of light and offers panoramic 360° field of view in an ultra compact packaging of only 40 mm diameter. The PAL lens provides a vertical field of view such as −40° to +50°. As shown in FIG. 1, the panoramic lens is a piece of glass that consists of a 360° circular aperture (R1), a rear aperture (R2) connecting to a collector lens, a top mirror (H) and a circular mirror (E). The viewpoint of the "virtual camera" is at the plane (O) of the ellipsoidal mirror (E). With this geometry, the PAL sensor can view the entire 360° scene around its vertical axis BC. The vertical field of view is determined by the effective sizes and the locations of the circular mirror E and the top mirror H. Usually the viewing angle is 90° vertically.

Figure 2B:
FIGS. 2a and 2b, shows photographic top and side views, respectively of the lens structure of FIG. 1.
Figure 2A:
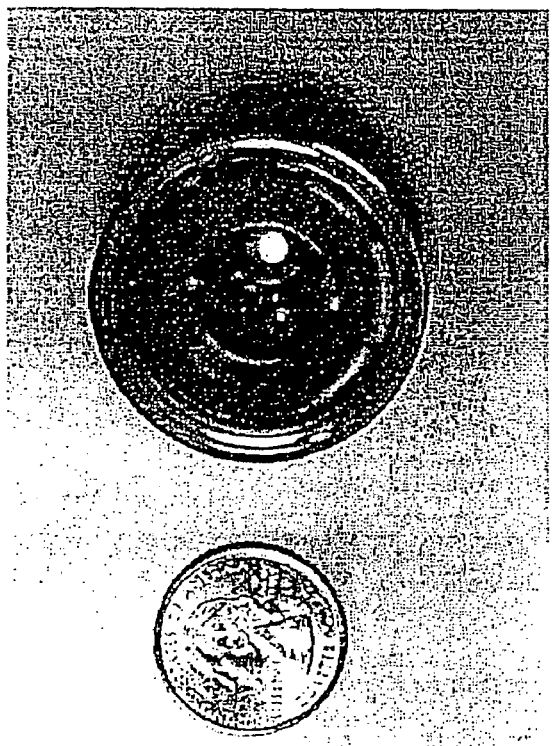
Figure 3:
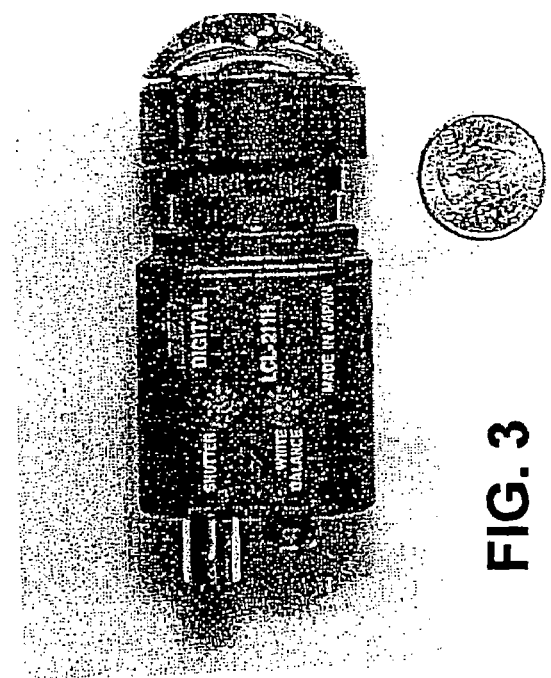
FIG. 3 is a photographic view of the lens structure of FIG. 1 shown integrated with a CCD camera.

The PAL is shown in FIGS. 2a and 2b. To maintain wide camera angle options, the PAL mounting is terminated with a C-type mount that fits most ⅓ in. and ½ in. pick-up devices, including CMOS and CCDs. Selection of a pick-up device is important because it defines the final image quality. The most important characteristic is resolution, which should be on the order of 1000 pixels per video line. Progressive mode pick-up devices are preferred because they eliminate temporal video field disparity. A wide range of such devices is available on the market, with the prices dropping as more market share goes to HDTV camcorders such as the JVC GR-HD1, which can record video in 720p HD format (1024×720 pixels in progressive scans at 30 fps). The PAL integrated with a camera is shown in FIG. 3.

Figure 4A:
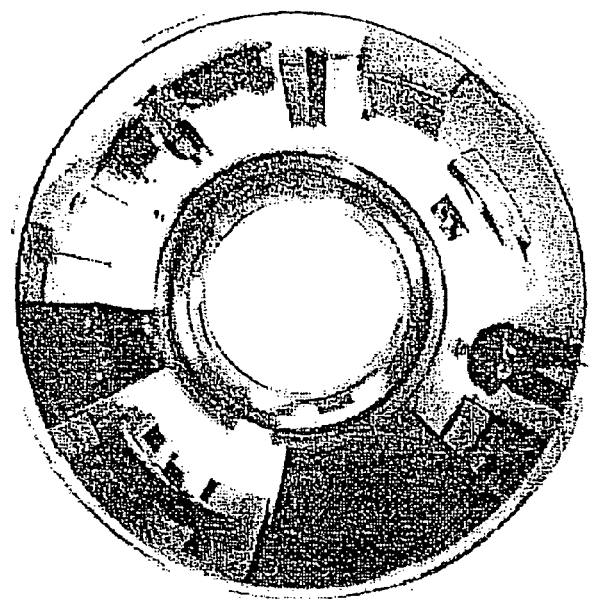
FIGS. 4a and 4b, is a photographic illustration of a PAL image before and after clipping, respectively.
Figure 4B:
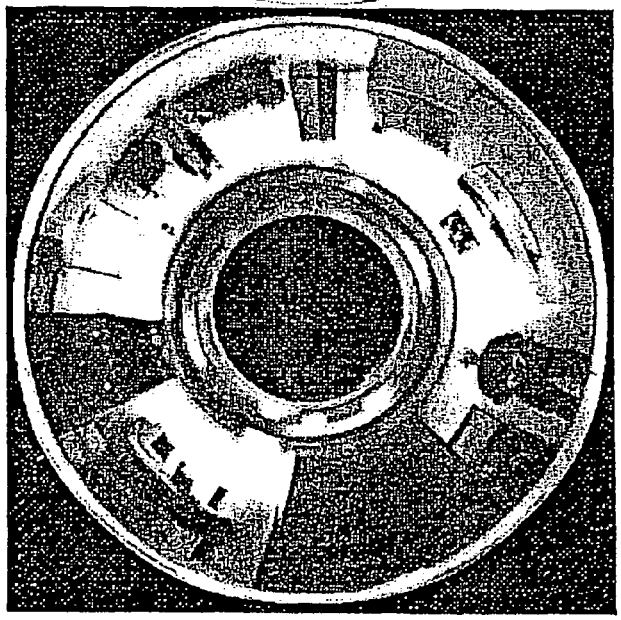
Figure 5:
FIG. 5 is a photographic representation of the unwrapped version of the PAL image of FIGS. 4a and 4b.

The image produced by the PAL lens is circularly symmetric, as seen in FIG. 4a. The PAL lens maps all the space within a 360° azimuth and 90° elevation into an annular ring image. The image can still be recognized, and it has relatively low geometric distortion compared to other panoramic visualization systems such as hyperbolic mirror-based 360° systems. The major advantage of the PAL is that it keeps vertical lines straight, significantly reducing the computational complexity of image unwrapping. Only part of the image in FIG. 4a can usefully be unwrapped, as seen in FIG. 4b. The center and outer edges of 4a do not carry any useful visual information, and are discarded. We maintain maximum resolution covering the entire annular ring image by optimizing the relay lens between the PAL and the camera. The unwrapped image unfolded to panoramic Cartesian coordinates is shown in FIG. 5.

Figure 6A:
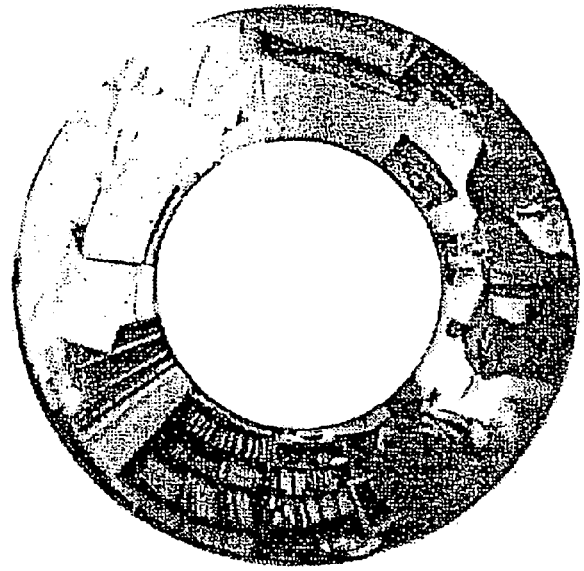
FIG. 6, comprising FIGS. 6a, 6b, 6c and 6d, provides photographic views of the image of FIGS. 4a and 4b in wrapped form in two different camera resolutions and in unwrapped form in the same two resolutions, respectively.
Figure 6B:
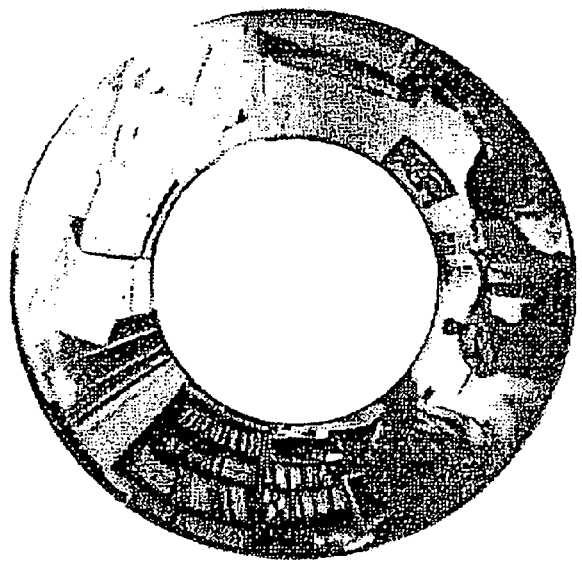
Figure 6C:
Figure 6D:
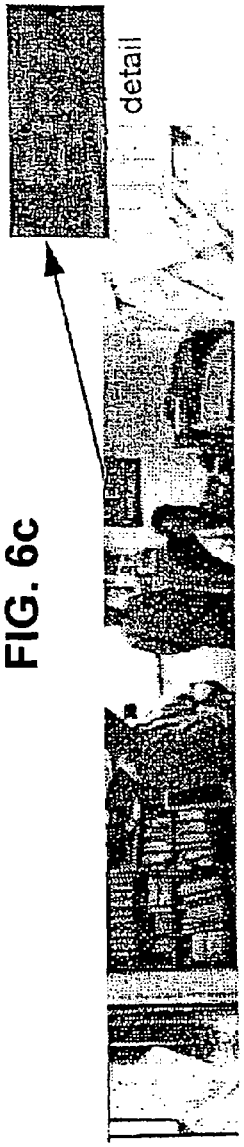

The PAL assembly was extensively tested on several cameras with a variety of pixel resolutions. We started with a standard NTSC camera, which thus had 420×240 pixels per field. Next we tested the lens with progressive scan cameras, one at 480×480 pixels and one at 1024×1024. For each PAL-camera combination we unwrapped the image and normalized it to the reference camera resolution by bicubic scaling. FIG. 6 compares the images. FIG. 6a shows the image captured by the 1024×1024 pixel camera. FIG. 6b shows a 480×480 pixel image. The corresponding unwrapped images are shown in FIG. 6c for 1024×1024 pixels and in FIG. 6d for 480×480. A detail of both images (a picture on the wall) is magnified in both cases. As expected, close examination of the detail from both images shows smoother edges and better color rendering for the high-resolution image.

Catadioptric Ultra-Wide-Angle Camera with Parabolic Mirror

Figure 7:
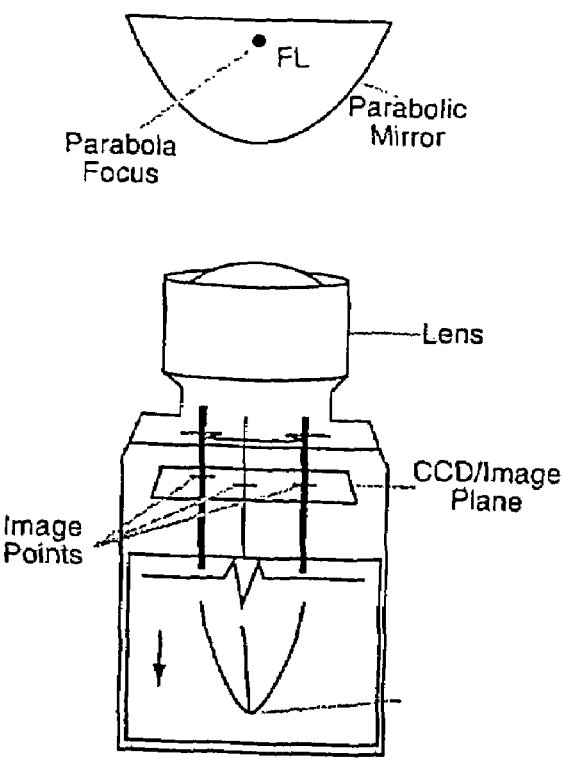
FIG. 7 is a schematic diagram of an alternative embodiment of a catadioptric omnidirectional ultra-wide-angle camera.
Figure 8:
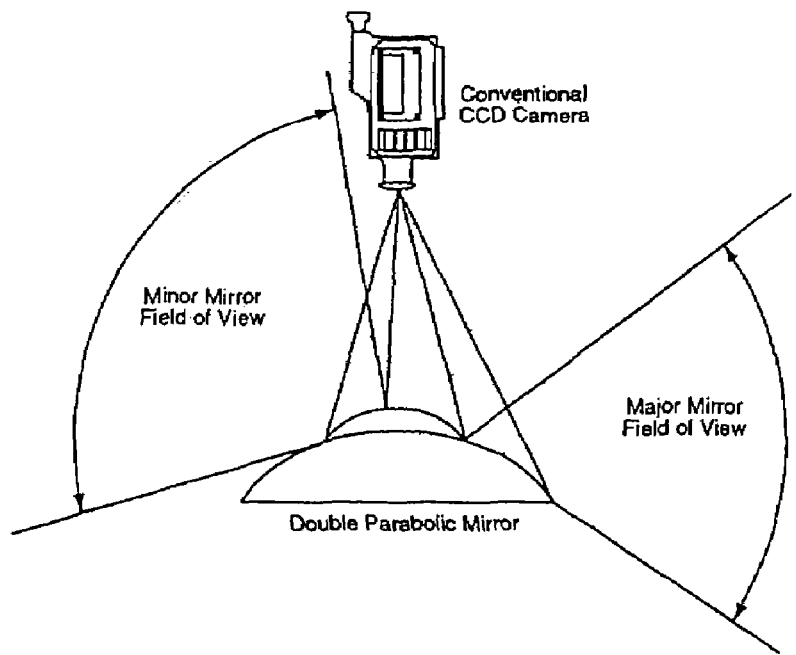
FIG. 8 is a simplified illustration of panoramic stereo imaging using a double parabolic mirror.

In an alternative panoramic vision approach, a catadioptric system creates omnidirectional vision by means of a parabolic mirror. The catadioptric omnidirectional ultra-wide-angle camera (CUWAC) consists of a miniature digital videocamera mounted in a frame and aimed directly at the apex of a parabolic mirror enclosed within a transparent hemisphere, as illustrated in FIG. 7. The dioptric camera lens in FIG. 7 images the focus of the parabola onto a CCD imager. This camera views in all directions within a hemisphere via a parabolic mirror. A CCD camera with a dioptric imaging lens faces the mirror a few inches away and produces a circular image of the reflection. This resulting circular image can then be converted into a normal view in any direction. However, the image quality varies a great deal across the field-of-view; the system magnification is greater at the center of the image and gradually decreases as the image height Y increases. This causes severe image degradation at the field-of-view margins. To overcome this drawback, we extended the panoramic imaging concept to two concentric parabolic mirrors that differ in curvature. In the two-mirror system illustrated in FIG. 8, the axes of the mirrors are collinear, and coincide with the optical axis of the dioptric camera. Each of the mirrors has a profile radially symmetric around this axis. The major parabolic mirror causes less demagnification, and captures those parts of the hemisphere at larger angles with better resolution. The minor mirror has a higher curvature and higher magnification, and captures the central parts of the scene, i.e., close to the optical axis.

The CUWAC parabolic optics ensure that it has a single effective center of projection, a single point through which all rays from a scene must pass on their way to the camera lens. That design mimics a camera that takes in only linear perspective, and allows the CUWAC computer software to generate linear perspective images that are free of distortion.

Two cameras with fisheye lenses or parabolic mirrors mounted back-to-back can produce views of 360°, a complete sphere, for surveillance or security operations. In teleconferences, such a panoramic camera can show simultaneously every participant seated around a table, in either hemispheric or linear perspective. It will allow a mobile robot to view hemispheric scenes. Placed atop a concert stage or above midfield during a sports event, the ultra-wide angle camera could provide a 360° view—an entire sphere—to viewers. With a joystick or mouse, the viewers could bring any view to their screens, and see not only hemispheric perspective but normal, undistorted, linear perspective.

Figure 9:
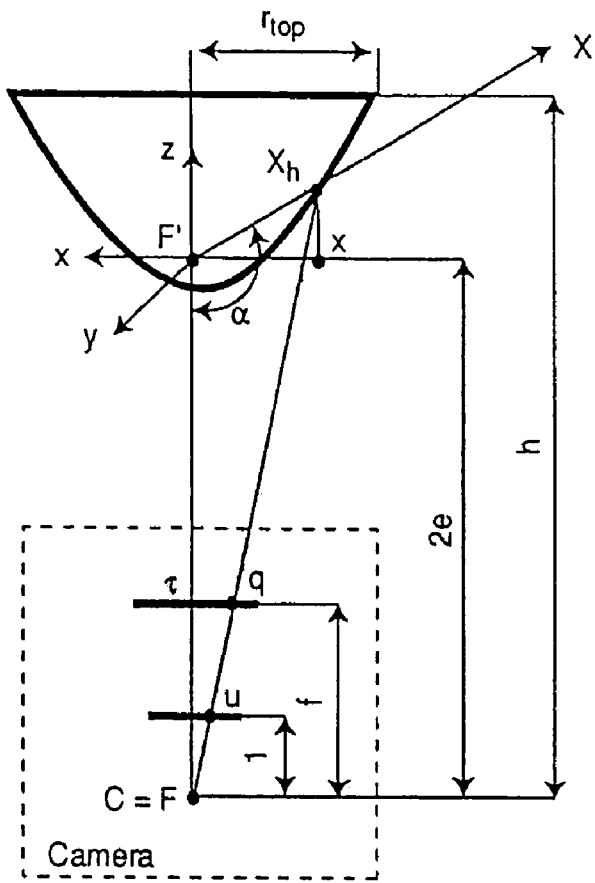
FIG. 9 is a schematic diagram showing the design of a multilevel parabolic mirror and camera.

The basic design of this multilevel parabolic mirror is shown in FIG. 9. The projection center C of the hyperbolic mirror coincides with focal point F. The perspective camera is modeled by an internal camera calibration matrix K, which relates 3D coordinates $X=[x,y,z]^T$ to retinal coordinates $q=[q_u,q_v,1]^T$ $$q = \frac{1}{z}KX. \quad (1)$$

Analysis of Panoramic Imaging System

Research in remotely operated and autonomous systems has shown the usefulness of imaging that can span a very wide field-of-view. If instead of a small conic view, a camera can capture almost an entire hemisphere of visual information ("view-sphere") at a time, the imaging system gains several advantages. First, it is not necessary to move the camera to fixate on an object of interest, or to perform exploratory camera movements. Second, processing global images of an environment or target scene is less likely to be affected by regions of the image that contain poor information. Third, a wide field-of-view eases the search for reference objects, as they do not disappear from the field-of-view; it helps stabilize image processing algorithms tracking such features. Fourth, a wide field-of-view makes it easier to distinguish image artifacts due to rotation of the camera from image artifacts due to object translation. The ability to view and image an environment panoramically is useful in applications ranging over machine vision, surveillance, collision avoidance, computation of ego-motion, simple and easy detection of objects moving in the environment, and robotics.

Figure 10:
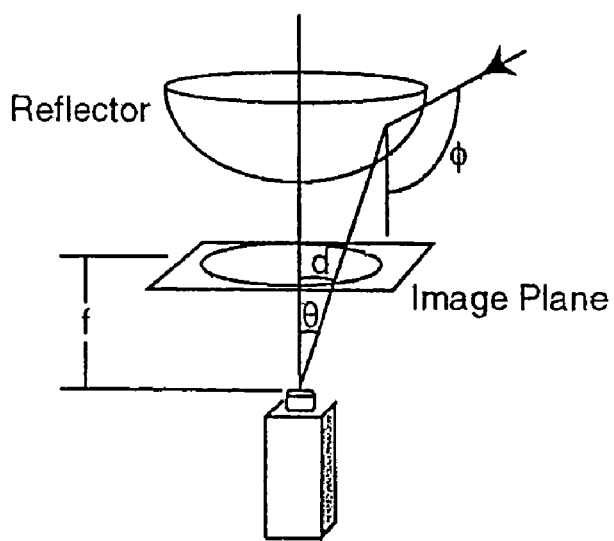
FIG. 10 is a schematic diagram of panoramic imaging using a convex reflecting mirror.

Reflective optics is cost effective and robust for global imaging. A camera placed below a convex reflecting surface can observe large fields-of-view (see FIG. 10). The mirror profile can be designed for angular gain to extend the camera viewing geometry. With an appropriately shaped mirror, cameras that typically have visual fields-of-view of ~30° can now image a full 360° in azimuth θ, and up to ±120° in elevation φ. FIG. 10 illustrates how a ray reflecting off the reflector surface is directed into the camera viewing cone.

Such an imaging device has obvious advantages: first, being a passive sensor it has minimal power requirements. Second, it has the potential to be extremely robust, since the sensor is purely solid state and has no moving parts. Third, curved mirrors can be made relatively free of the optical distortion that is typical of lenses.

Cameras with convex mirrors can acquire imagery instantly at video rates; they can be compact, and can cost relatively little to produce. Commercial "fisheye" lenses tend to be much more costly and bulkier than mirrors. In addition, camera optics based on convex mirrors can have well defined mathematical relationships that can be coded into the image processing and data filtering to map the curved geometry of the view-sphere onto the 2D planar pixel array. There are no simple and cost effective purely optical means for correcting the image deformation that occurs in going from a 3D representation to a 2D representation. A fundamental difficulty with panoramic imaging using a curved reflective surface is that image resolution depends on position within the image. In images from standard spherical convex reflectors, resolution depends upon elevation. Visual patches at high elevations are quite different in resolution from those near the horizontal, because they capture smaller solid angles of visual space than do equatorial patches. Designing the mirror profiles to be equiangular, transforms a curved image into a cylindrical projection, preserving a linear relationship between the angle of incidence of light onto the mirror surface and the angle of reflection into the camera with respect to the center of the detector array. This ensures that the camera maintains uniform resolution of the environment in the vertical plane independent of elevation angle, which is very important to high quality panoramic imaging. Left unaccounted for in both mirror design and image processing, vertical nonuniformity causes poor resolution across a given target scene.

POC Panoramic Imager for Day/Night Operation

Figure 11:
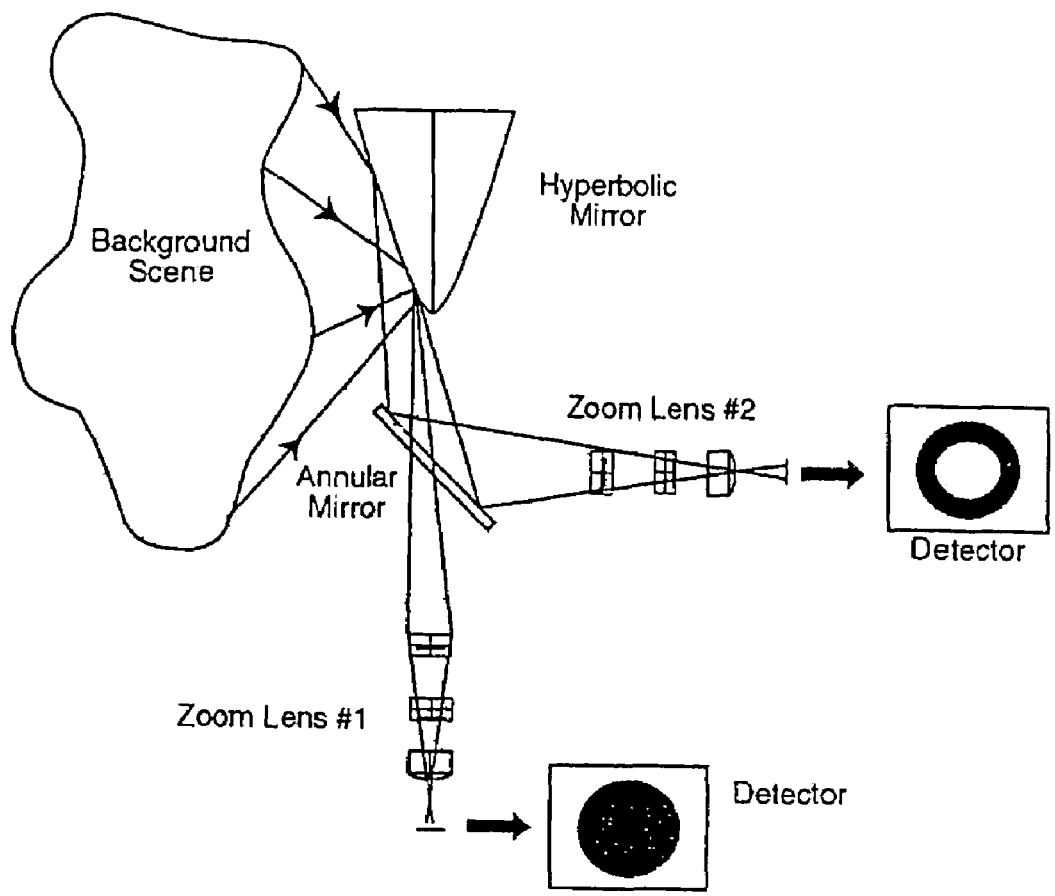
FIG. 11 is a schematic diagram of panoramic camera system useful for day and night operation.
Figure 12:
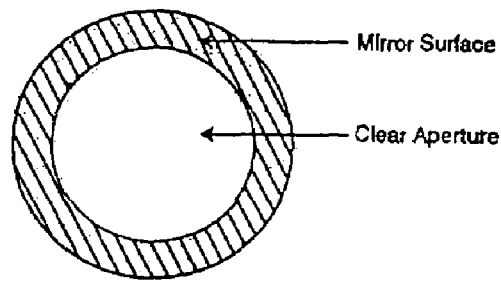
FIG. 12 is a schematic diagram of an annular flat mirror used in the system of FIG. 11.

FIG. 11 illustrates a modular visible/infrared camera system. Light from the scene is incident on a hyperbolic mirror. The surface profile of this mirror (i.e., conic constant, radius of curvature, and aperture size) is designed in such a way that the focus of the hyperbolic curve acts as the camera projection center, where all rays appear to intersect. Alignment of the mirror with the cameras in this system is critical to maintain the linear relationship between the elevation and camera viewing angles. Those rays satisfying the single viewpoint relationship are reflected by the hyperbolic mirror surface, and are incident on an annular flat mirror (see FIG. 12) that is oriented at 45° with respect to the nadir. Half of the light hitting the annular mirror passes through the clear aperture (lower elevations of the viewing geometry) within the central portion of the mirror, and half the light (higher elevations of the viewing geometry) is reflected at 90°.

The light propagating along each optical path is collected by a zoom lens. The video zoom lens for this optical system is a commercial off-the-shelf product with a focal length varying from 8 mm to 48 mm, a working distance that ranges from 1.2 m to ∞, and compatibility with ½ in. format detectors, and has F numbers that range from F1.2-16 and angular fields-of-view from 44.6° to 8°. The two zoom lenses enable us to independently adjust each arm of the sensor. They need not be set to the same zoom magnification (i.e., the blur spot size can be set to fill up the pixel array); this can improve the resolution in each portion of the visual image, which has the benefit of enabling the system to equalize resolution as a function of viewing elevation for the panoramic imager. The minimum blur spot size for the panoramic imager with this zoom lens is estimated to be ~1.5 to 2 times the diffraction limit. The light from each zoom lens is imaged onto a commercially available 3 megapixel, ½ in. format, CMOS silicon detector chip. The number of pixels in each detector array is 2048×1520, with a 7 µm linear pitch. The larger pixel size improves the low light sensitivity of the camera chip to ~0.05 lux with reduced fixed pattern noise. According to the manufacturer's specifications, the SNR for this camera is 78 dB. The camera operates in noninterlaced mode (progressive scan), and produces full frame readouts at video rates of 30 frames per second. Full asynchronous image capture with programmable partial scan (region-of-interest mode of operation) gives these cameras the flexibility for numerous daytime/nighttime applications. Both color and monochrome versions of the camera are available. In the color version the overall resolution is reduced by the Bayer color filter; the resolution is about ⅓ for each of the primary colors.

Figure 13:
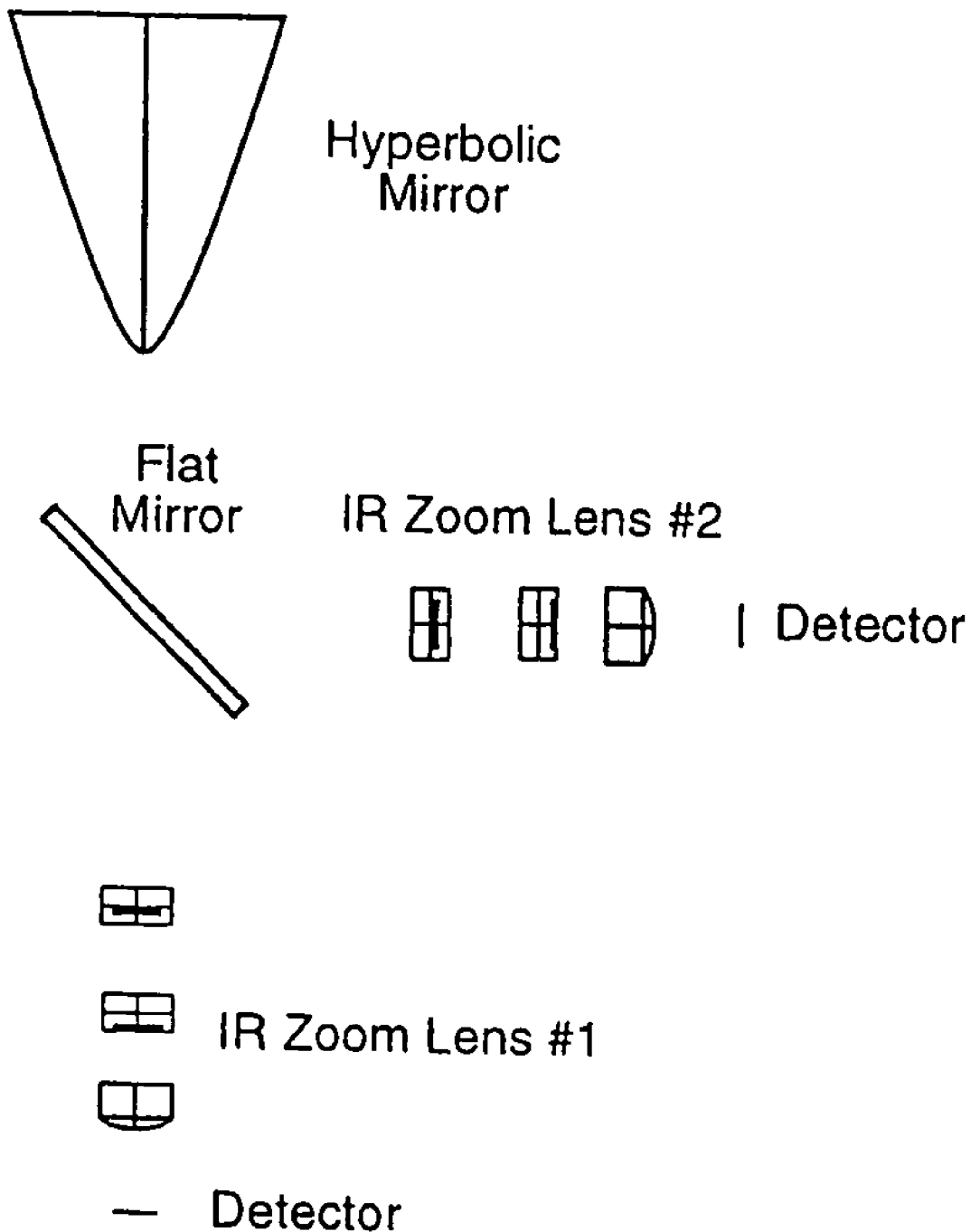
FIG. 13 is a schematic diagram of panoramic imager having a second medium wavelength infrared optical channel.

Because silicon is sensitive into the near infrared region (700 nm to 1100 nm) of the spectrum, the imager can be used for nighttime surveillance. Moreover, the panoramic imager is designed to be modular so that a second channel can easily be introduced to extend the nighttime vision capability into the mid-wave infrared (3 to 10 µm) region. This design is envisioned with a flat mirror, coated for >98% reflectivity over the MWIR spectrum. The 45° orientation of the flat mirror directs the light toward a second optical channel (see FIG. 13).

The rest of the optical layout would be similar to that described previously, with the addition of PtSi or HgCdTe detectors and infrared zoom lens assemblies to detect the infrared scene. Note that these infrared focal plane arrays are only QVGA scale (320×240 pixels), with a linear pitch of 12 µm, so overall resolution would be reduced. However, a multicolor panoramic imager could track targets under conditions that would be beyond the capabilities of the silicon-based detectors. At night infrared irradiance is about two orders of magnitude greater than that in the visible spectrum under moonlight conditions. Additionally one may apply sophisticated image interpolation techniques to increase the image resolution.

Mathematical Foundation for Panoramic Image Unwrapping

Figure 14:
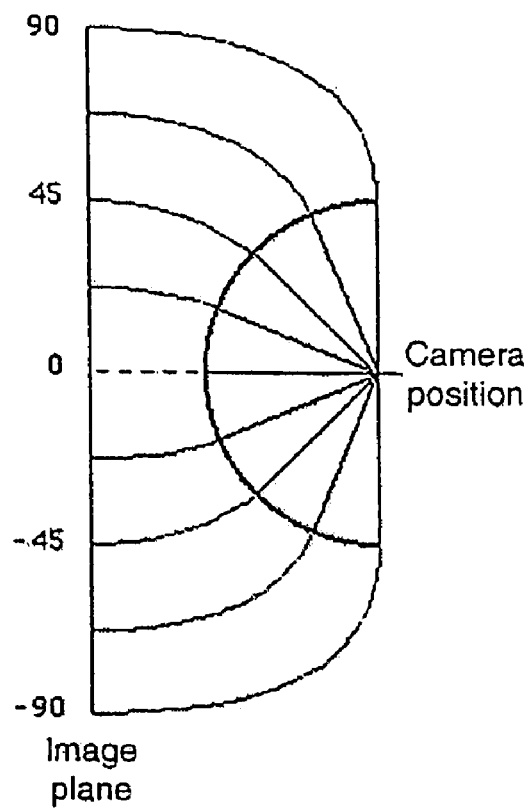
FIG. 14 is a schematic diagram of the hemiphereic view circular projection of a circular fisheye lens.

The circular fisheye lens projects a hemispheric view of the surroundings into a circular image as shown in FIG. 14. The panoramic image is a 180° fisheye projection. The projected panoramic image covers a full 180° horizontally, but because of cropping of the frame it covers substantially less vertically, ~135°.

Figure 15:
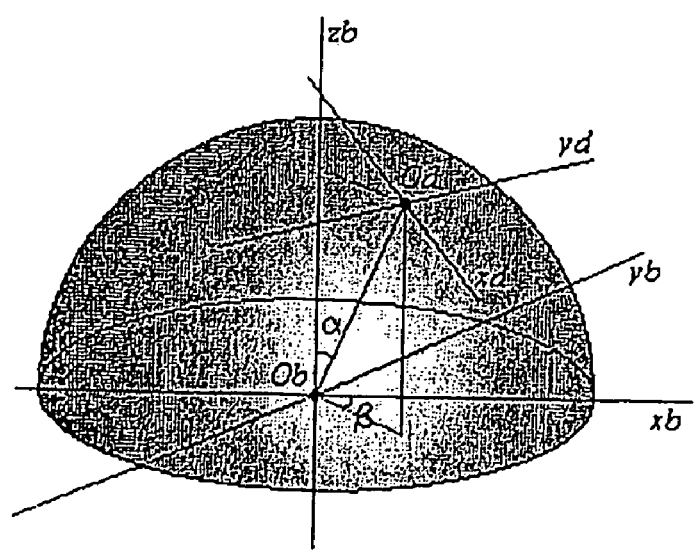
FIG. 15 is a geometric diagram of a spherical coordinate mapping of the circular fisheye lens.
Figure 16A:
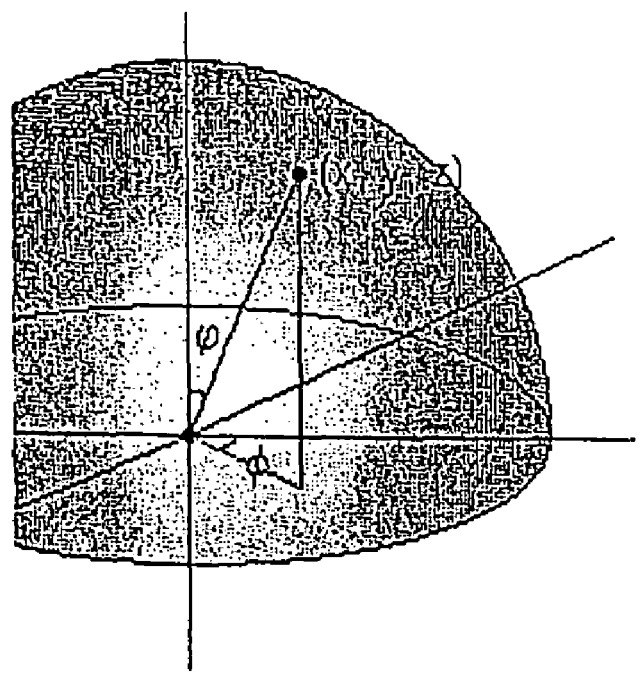
FIGS. 16a and 16b, is a geometrical representation of spherical and angular mapping, respectively.
Figure 16B:
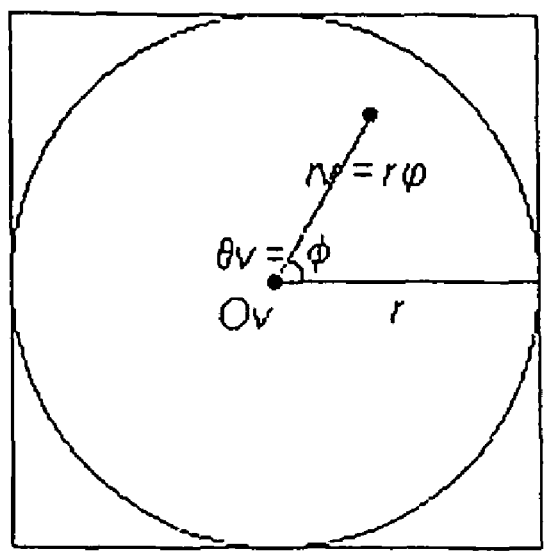

In constructing the unwrapping process, the unit assigned to the limiting circle of the 180° fisheye projection is radius, and its center is chosen as the image origin. Points in the image are assigned polar coordinates (r,θ) and converted to spherical coordinates with angular coordinates θ and φ, where θ is longitude and φ is the angle from the axis of projection as in Eq. (2). FIG. 15 geometrically illustrates the spherical mapping of a circular fisheye image. The transformation from polar to spherical coordinates keeps θ the same and transforms r into φ. FIG. 16 shows the angles of mapping coordinates (FIG. 16a) and a geometrical representation of angular coordinate conversion (FIG. 16b).

$$\begin{pmatrix} x_b \\ y_b \\ z_b \end{pmatrix} = \begin{pmatrix} \cos\alpha & 0 \\ \sin\alpha\sin\beta & \cos\beta \\ -\sin\alpha\cos\beta & \sin\beta \end{pmatrix} \begin{pmatrix} x_d \\ y_d \end{pmatrix} + \begin{pmatrix} \sin\beta \\ -\sin\alpha\cos\beta \\ \cos\alpha\cos\beta \end{pmatrix} \quad (2)$$

Figure 17A:
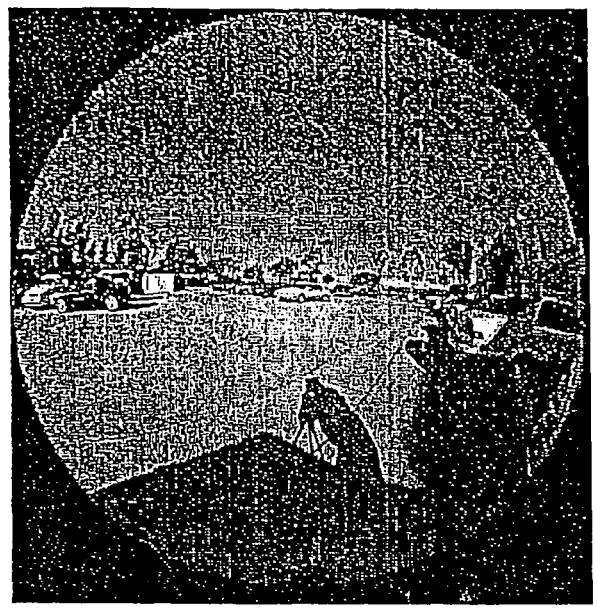
FIGS. 17a and 17b, is a photographic view of the original and converted images, respectively, of a circular fisheye lens.
Figure 17B:
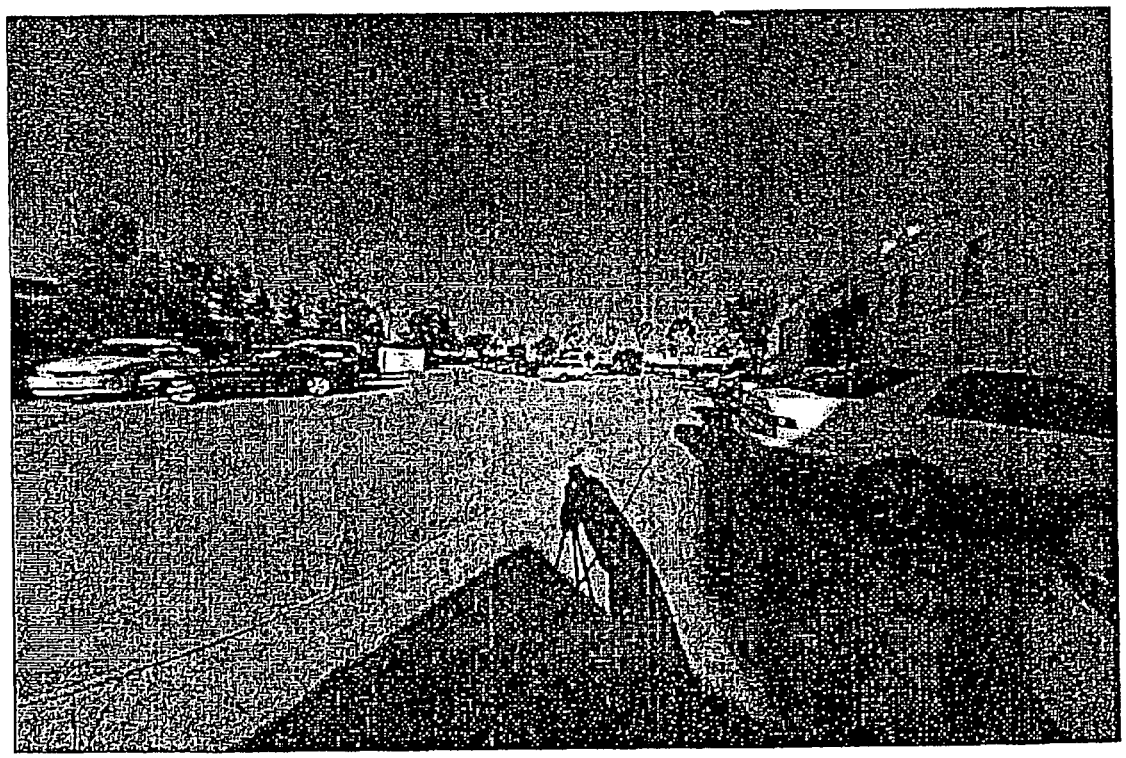

Then we can map the hemicube to the fisheye image, and from this we can convert a 180° fisheye image (see FIG. 17a) into a normal perspective image, with the result shown in FIG. 17b. The mapping equations used for transformations of coordinates are:

$$\begin{pmatrix} \phi_b \\ \varphi_b \end{pmatrix} = \begin{pmatrix} \arctan\left(\frac{y}{x}\right) \\ \arctan\left(\frac{\sqrt{x_b^2 + y_b^2}}{z}\right) \end{pmatrix} \quad (3)$$

$$\begin{pmatrix} x_v \\ y_v \end{pmatrix} = \begin{pmatrix} r_v \cos\theta \\ r_v \sin\theta \end{pmatrix} \quad (4)$$

$$\begin{pmatrix} \theta_v \\ r_v \end{pmatrix} = \begin{pmatrix} \phi_b \\ r\varphi_b \end{pmatrix} \quad (5)$$

The mapping pipelines the following steps for continuous operation of incoming images:
1. Image plane to angular coordinate
2. Angular coordinate to spherical coordinate
3. Find inverse transformation $$(x_d, y_d) \xrightarrow{(\alpha,\beta)} (x_b, y_b, z_b) \rightarrow (\phi_b, \varphi_b) \xrightarrow{r} (\theta_v, r_v) \rightarrow (x_v, y_v) \quad (6)$$

Some of the necessary equations involve spherical coordinates. The angles θ and φ in the following equations are related to a canonical Cartesian (x,y,z) coordinate frame by:

$$x = r \cdot \sin(\delta) \cdot \cos(\theta) \quad (7)$$

$$y = r \cdot \sin(\delta) \cdot \sin(\theta) \quad (8)$$

$$z = r \cdot \cos(\theta), \quad (9)$$

and their inverse:

$$r^2 = x^2 + y^2 + z^2 \quad (10)$$

$$\cos(\theta) = x/\sqrt{x^2 + y^2} \quad (11)$$

$$\sin(\theta) = y/\sqrt{x^2 + y^2} \quad (12)$$

$$\cos(\phi) = z/r \quad (13)$$

$$\sin(\phi) = \sqrt{x^2 + y^2}/r. \quad (14)$$

Real-time Panoramic Video Conversion Software

This section discusses the fundamentals of video mapping software architecture and design issues. The conversion system is coded and debugged based on Microsoft Windows Video technology and additional video manipulating software architecture. The performance and stability of the software have been optimized for real-time video conversion software.

Designs and Functionalities of Video Mapping Software

The preferred embodiment of the invention comprises real-time panoramic video conversion software to convert video from circular polar coordinates to Cartesian panoramic video with 2000×1000 video resolution at 30 frames per second.

The real-time panoramic conversion software has been developed in Microsoft Direct3D and DirectShow. Microsoft Direct3D has full capabilities for rendering and mapping images in real time. Direct3D can directly access and manipulate video memory without calling upon operating system services, so the graphics can be manipulated in hardware. The following lists summarize the capabilities of Direct3D.

Direct3D Functionality
    Device-dependent access to 3D video-display hardware in a device-independent manner
    Support for 3D z-buffers
    Switchable depth buffering
    Transformation and clipping
    Access to image-stretching hardware
    Exclusive hardware access
    Immediate access to the transformation, lighting, and rasterization 3D graphics pipeline
    Software emulation if hardware acceleration is not available Direct3D Low Level Functionality
    3D coordinate systems and geometry
    Shading techniques
    Matrices and transformations
    Vectors and vertices
    Copying surfaces
    Page flipping and back buffering
    Rectangles Direct3D Application Level Functionality
    Bump mapping
    Environment mapping
    Geometry blending
    Indexed vertex blending
    Patches
    Point sprites
    Procedural pixel shader
    Procedural vertex shaders
    Quaternions
    Spotlights
    Tweening
    Vertex blending
    Volume textures.

Microsoft introduced new technology to apply Direct3D to video applications gluelessly for real-time manipulation of video with mapping, blending, textures, and shadings. The following highlights DirectShow technology.
    Architecture for streaming media
    High-quality playback of multimedia streams
    File based
    Network stream
    Universal decoding capability
    Glueless interface with other DirectX technology
    Automatic detection of hardware acceleration support
    Common Object Model (COM)-based interface.

The real-time video software was developed around the core functions of Microsoft Direct3D and DirectShow, but the innovative and unique architectural and hierarchical development of this software is the first in the multimedia world that can convert and display panoramic video in real time without noticeable latency.

Customizing Microsoft Video Mixing Renderer

The Video Mixing Renderer (VMR) is a new DirectShow filter, available only for Windows XP Home Edition and XP Professional, replacing both Overlay Mixer and Video Renderer, and adding many new mixing features. In terms of both performance and breadth of features, the VMR represents the new generation in video rendering on the Windows platform.

VMR supports the following new features:
    Real mixing of multiple video streams, taking advantage of the alpha-blending capabilities of Direct3D hardware devices.
    The ability to plug in your own compositing component to implement effects and transitions between video streams entering the VMR.
    True windowless rendering. It is no longer necessary to make the video playback window a child of the application window to play video back. The VMR's new windowless rendering mode makes it easy for applications to host video playback within any window without having to forward window messages to the renderer for renderer-specific processing.
    A new renderless playback mode, in which applications can supply their own allocator component to get access to the decoded video image prior to its being displayed on the screen.
    Improved support for PCs equipped with multiple monitors.
    Support for Microsofts new DirectX Video Acceleration architecture.
    Support for high-quality video playback concurrently in multiple windows.
    Support for DirectDraw Exclusive Mode.
    100% backward compatibility with existing applications.
    Support for frame stepping and a reliable way to capture the current image being displayed.
    The capability for applications to easily alpha-blend their own static image data (such as channel logos or UI components) with the video in a smooth flicker-free way.

The VMR depends entirely on the graphics processing capabilities of the computer display card; the VMR does not blend or render any video on the host processor, as doing so would greatly impact the frame rate and quality of the video being displayed. The new features offered by the VMR, particularly blending of multiple video streams and/or application images, depend strongly on the capabilities of the graphics card. Graphics cards that perform well with the VMR have the following hardware support built in:
    Support for YUV and "non-power of 2" Direct3D texture surfaces.
    The capability to StretchBlt from YUV to RGB DirectDraw surfaces.
    At least 16 MB of video memory if multiple video streams are to be blended. The actual amount of memory required depends on the image size of the video streams and resolution of the display mode.
    Support for an RGB overlay or the capability to blend to a YUV overlay surface.
    Hardware accelerated video decoding (support for DirectX Acceleration).
    High pixel fill rates.

In our conversion software, we specifically customized VMR renderless mode to maximize the capability and flexibility of the software to better manipulate the controlling parameters. VMR renderless mode features a customized allocator for the customized rendering surface, and a customized renderer for the customized rendering mode.

In renderless playback mode, the application

Manages the playback window.

Allocates the DirectDraw object and the final frame buffer.

Notifies the rest of the playback system of the DirectDraw object being used.

"Presents" the frame buffer at the correct time.

Handles all resolution modes, monitor changes, and "surface losses"—advising the rest of the playback system of these events.

The VMR

Handles all timing related to presenting the video frame.

Supplies quality control information to the application and the rest of the playback system.

Presents a consistent interface to the upstream components of the playback system, which are not aware that the application is performing the frame buffer allocation and the rendering.

Performs any video stream mixing that may be required prior to rendering.

Basically, the conversion software calls various functions of VMR and customized DirectX surfaces to make them fit our specific purpose, which is real-time non-linear image transformation with streaming video in progress. We purposely coded this software with VMR-7 for Windows XP only. DirectX 9 with VMR-9 code migration can be made software compatible with other operating systems such as Windows 9x and Windows 2K as well as Windows XP.

Real-time Panoramic Unwrapping Software

Figure 18:
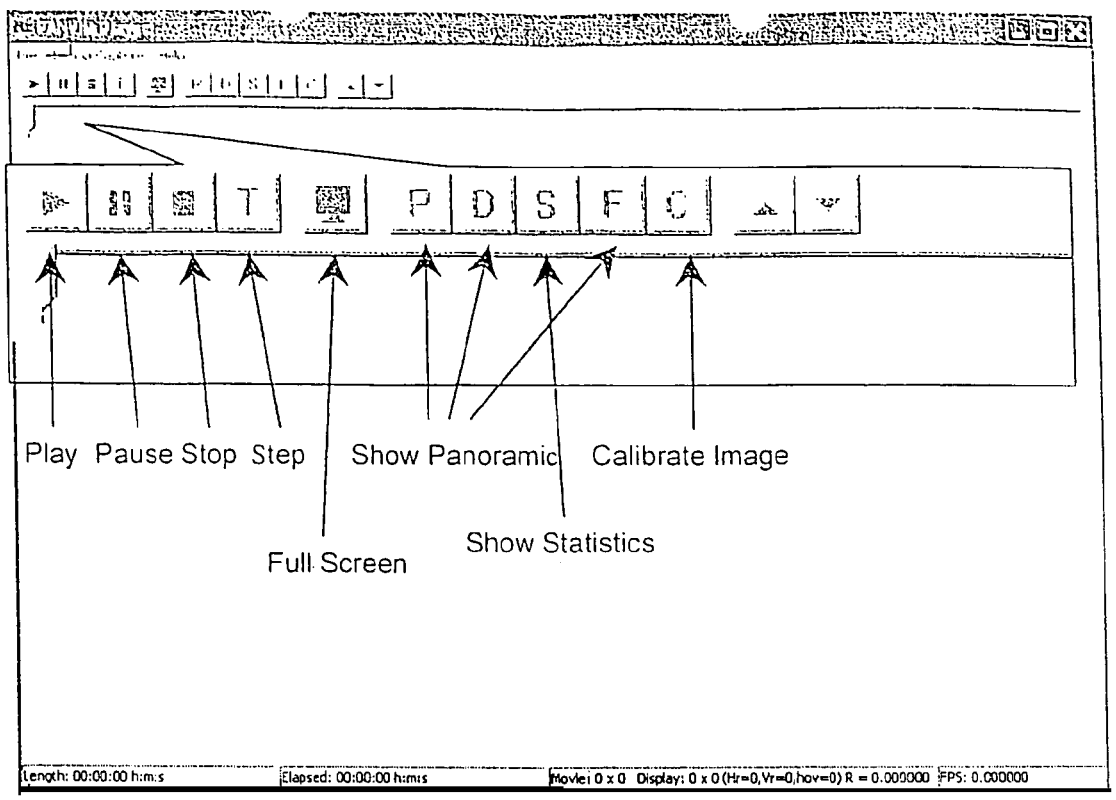
FIG. 18 is a computer screen representation of the graphic user interface for real-time conversion ("unwrapping") software of the preferred embodiment of the invention.
Figure 19:
FIG. 19 is a computer screen representation of an image captured by a fisheye video camera system in full frame at 30 fps.
Figure 20:
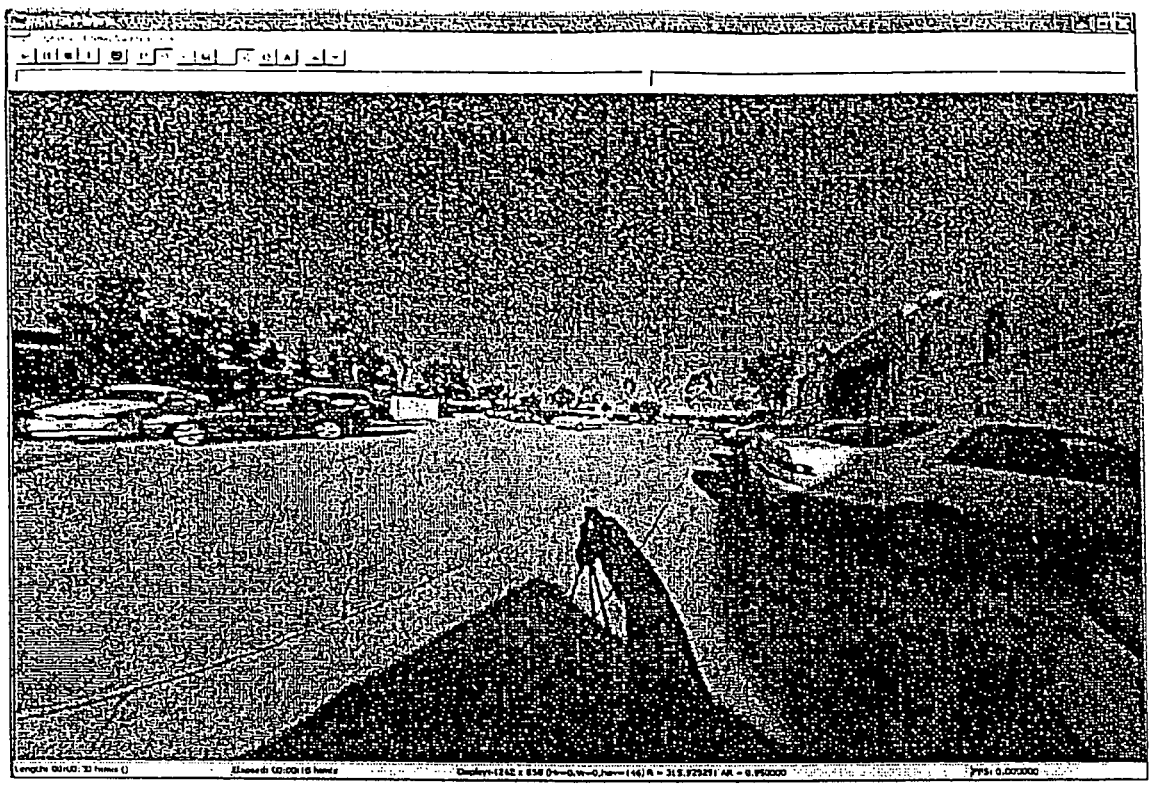
FIG. 20 is a 1500×1000 Cartesian computer screen image converted at 30 fps from the fisheye image of FIG. 19 using the "unwrapping" software of the present invention.
Figure 21:
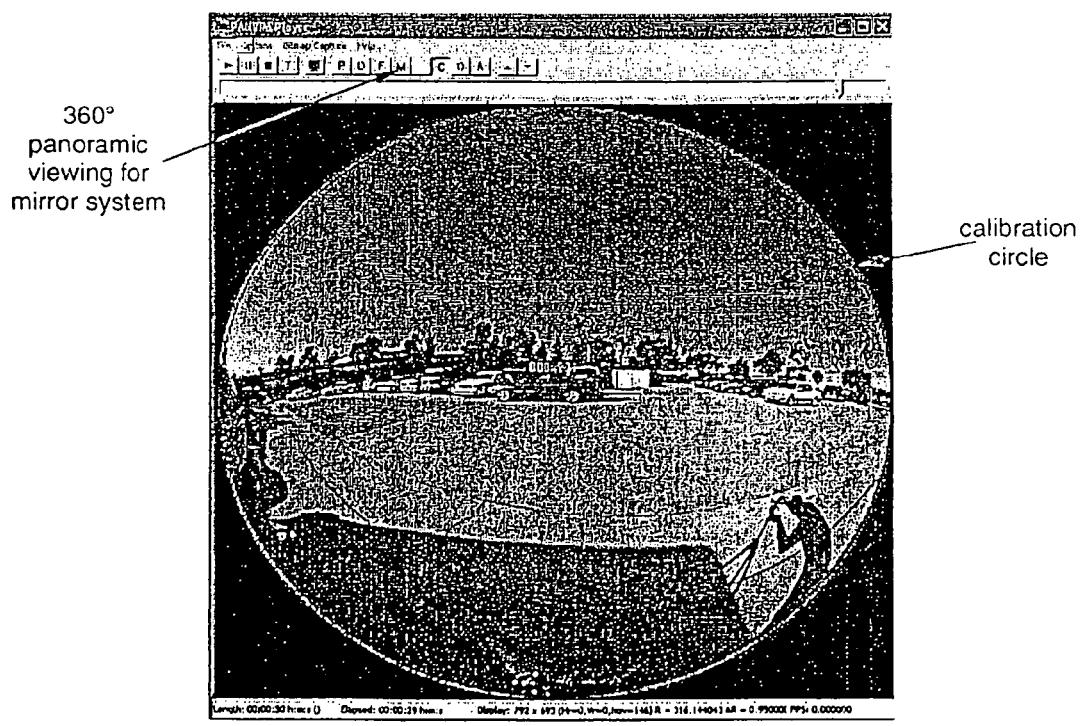
FIG. 21 is a computer screen representation similar to that of FIG. 19 but showing the effect of various calibration methods for reducing distortion.

The real-time conversion software implements Direct3D Immediate Mode with geometrical relationships to convert spherical images to Cartesian images in arbitrary perspective. The world management of Immediate Mode is based on vertices, polygons, and commands that control them. It allows immediate access to the transformation, lighting, and rasterization 3D graphics pipeline. Image conversion is applied to primitives so that there is no intervening overhead from other interfaces and direct access hardware functions. We tested our software with Nvidia GeForce, ATI Radeon, and Intel low-profile VGA chips. The final code is compatible with most video acceleration chips and processors, so it can be used with major hardware platforms. FIG. 18 shows the graphic user interface (GUI) for the conversion software. FIG. 19 shows fisheye video in the GUI. FIG. 20 shows the corresponding panoramic video converted from the spherical fisheye image in real time (on the fly) at the full 30 frames/second. The unwrapping algorithm may be optimized to alleviate distortion near frame edges. FIG. 21 shows enhanced functions of the player.

The following list summarizes the player capabilities and functions:

Universal playback capability (MPEG, AVI, and more)

Bitmap capture (right-button click)

Calibration by clicking three points on a circle (shows circle in red)

Adjustments of aspect ratio for non-square pixel digitizers

Change center of view in 360° panoramic viewing mode

Zoom, pan, and tilt

F1 and F2 for zoom-in and -out

Arrow buttons for pan and tilt

Status bar indicates movie size, capture device, playing time, resolution of movie and display, performance, and viewing angles Capture (and DV) device properties.

And performance parameters are:

Panoramic and 360° view: ~30 frames/second with anti-aliasing and anisotropic filters 180° view: ~20 frames/second and up depends on processor and video card with anti-aliasing and anisotropic filters Video resolution—full screen up to 2048×1536 pixels.

Radiometric Ray-Tracing ($R^2T$)

Figure 22:
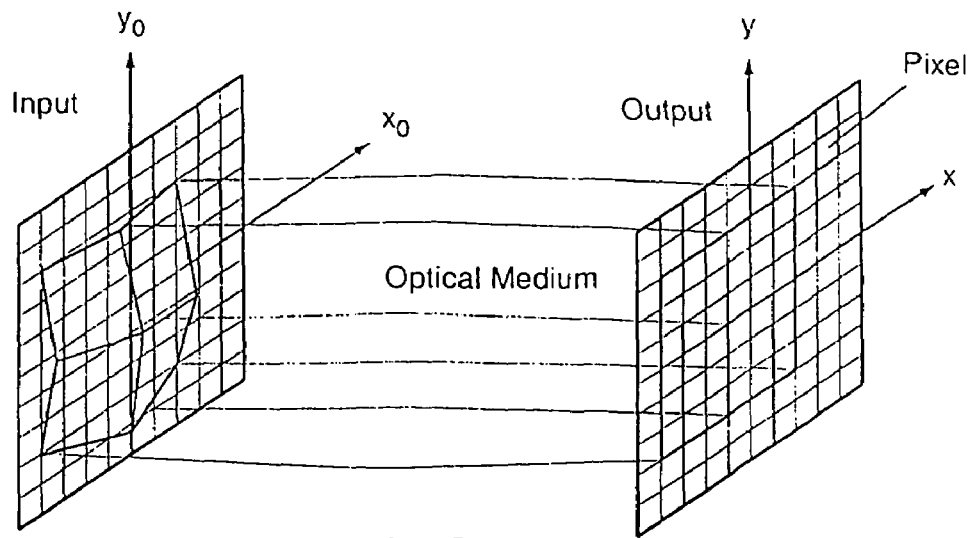
FIG. 22 is a graphical representation of radiometric ray tracing from an input plane to an output plane for a pixel block.

$R^2T$ yields a single-valued mapping of radiometric quantities such as luminance (brightness) from an input plane to an output plane as shown in FIG. 22 for any continuous optical medium.

Figure 23A:
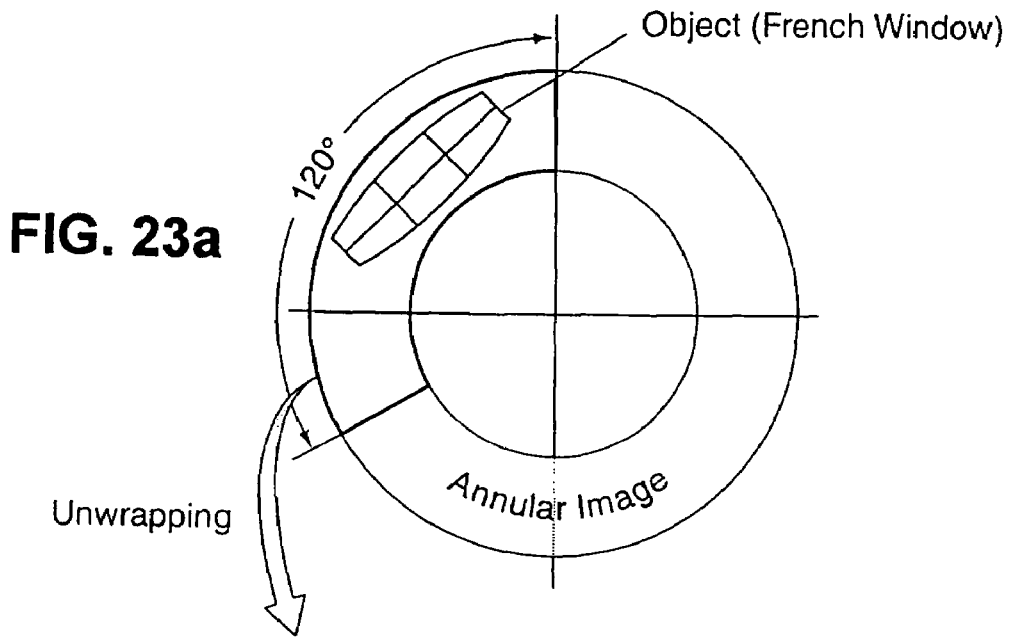
FIGS. 23a, 23b and 23c, is a graphical representation showing transformation process from an annular image to an undistorted rectangular image.
Figure 23B:
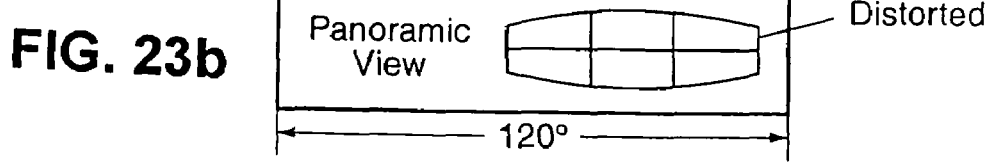
Figure 23C:
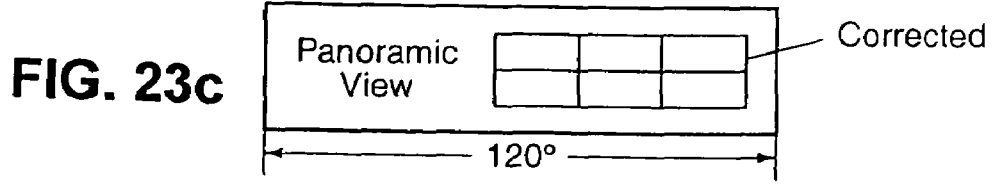

This procedure is illustrated in FIGS. 23a, 23b and 23c, progressing from an annular image (a) to a distorted unwrapped image (b), and then to a corrected unwrapped image (c). Transformation from a distorted (b) panoramic image of a French window into a perfect (c) panoramic image is by $R^2T$, is based on a priori ray-tracing, equivalent to transformation from a curved system of coordinates into the Cartesian coordinate system. To perform this operation in real time, we divide the 120° horizontal viewing area into a large number of pixel blocks, 10×10 or more, and develop a uniform transformation for each block separately.

Hardware Acceleration

Conventional omni-view systems use an image by image conversion process to generate transformed (or unwrapped) video with or without hardware acceleration. Yet, conventional transformations (of commercial off the shelf software) are done pixel by pixel and require tremendous CPU power to transform the spherical or cylindrical images to Cartesian or plain view images. The Applicant's approach to this problem is to increase the performance many fold (typically about ~30 times faster than any existing software in current market), and yet retain the quality of images or video. Animation applications require tremendous processing power for manipulating images because they must provide the real time conversions of perspective, zoom level, morphing, rendering, and so on. Many competing video card manufacturers have been developing these 3D animation engines for Video card (or Graphics Processing Unit) with very high performance graphical performance for better games. We have found that using these high-performance features of GPUs or 3D engines makes it possible to achieve real-time performance on omni-view systems for real-time video conversions.

The inventive software utilizes vertex based transformation rather than pixel by pixel processing. Each vertex includes coordinates, color, and image plane information for perspectives. Number of vertices for a single image is limited to 65536 because we did not find any quality enhancement for more vertices than 65536. The following Graphics Processing Units' (GPU) internal functions are used for hardware acceleration: Lighting, Geometry Blending, Alpha, Anisotropic filter or linear filters for distortion correction, 3D textures, Cube textures, Clamping, and Vertex and pixel Pipelining.

Lighting: provides detailed brightness and optical calibration

Geometry and Vertex Blending: increases the realism of transformed image

Alpha Blending: provides the character and drawing overlays to primary video

Anisotropic filter: increases the quality by minimizing transforming distortion 3D textures: easier for 3D coordinate transformation Cube textures: for perfect transformation on arbitrary perspective Clamping: for out-of-bound image control Vertex and pixel Pipelining: increases image manipulation in many orders of performance.

In summary, the actual image manipulation of colors, lines, points, and perspective changes are all done in hardware or in GPU more specifically. Furthermore, video presentation is also done in hardware with no intervention to other functionalities such as 3D manipulation of vertices. The only CPU load is to calculate the vertex coordinate changes according to the governing equations, e.g. transforming spherical coordinates to Cartesian coordinates.

Software Flow

Figure 24:
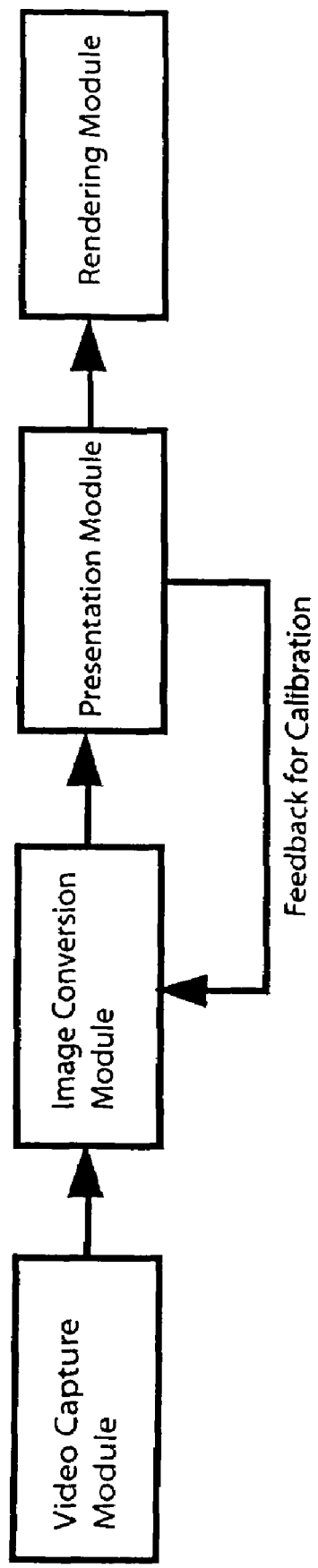
FIG. 24 is a block diagram of software flow of real-time unwrapping used in the present invention.

As shown in FIG. 24, the software comprises four modules: 1) video capturing, 2) image conversion, 3) presenting image as image manipulation module, and 4) rendering image on video surface. The software provides many video capturing features such as DV capture, video capture with any Microsoft ActiveMovie compliances (16 bit), video capture with WDM (windows driver model —32 bit) drivers for video streaming, and third party capture drivers that are recognized by Windows operating system.

Video capture module often introduces significant overheads and resources for software. However, providing proper pipelining and buffering avoids those problems.

The image conversion module converts incoming bitmaps in pipelined fashion with multithreading (or super pipelining), so that minimum delay is guaranteed during the process. In this module, Microsoft Direct3D and DirectX functions are utilized for image conversions and manipulation of video memory. The image manipulation is done in primitive level rather than in application level, so that we can have maximum level of programmability and flexibility. In addition, the optimization of performance is possible but the coding is extremely tedious because it requires programming in C++, C, and assembly languages.

The presentation module is responsible for preparing video, bitmap capture, calibration (feed-backed to image conversion module), and drawing circles or showing performance information on top of video.

Finally, the rendering module is heavily dependent on hardware (video engine) and mostly done by using built-in functions of Microsoft DirectShow. This module sends the final image streams to video memory.

FIG. 24 illustrates the overall software architecture for our real-time omni-view video software of the presently preferred embodiment.

Panoramic Rangefinder

Figure 25:
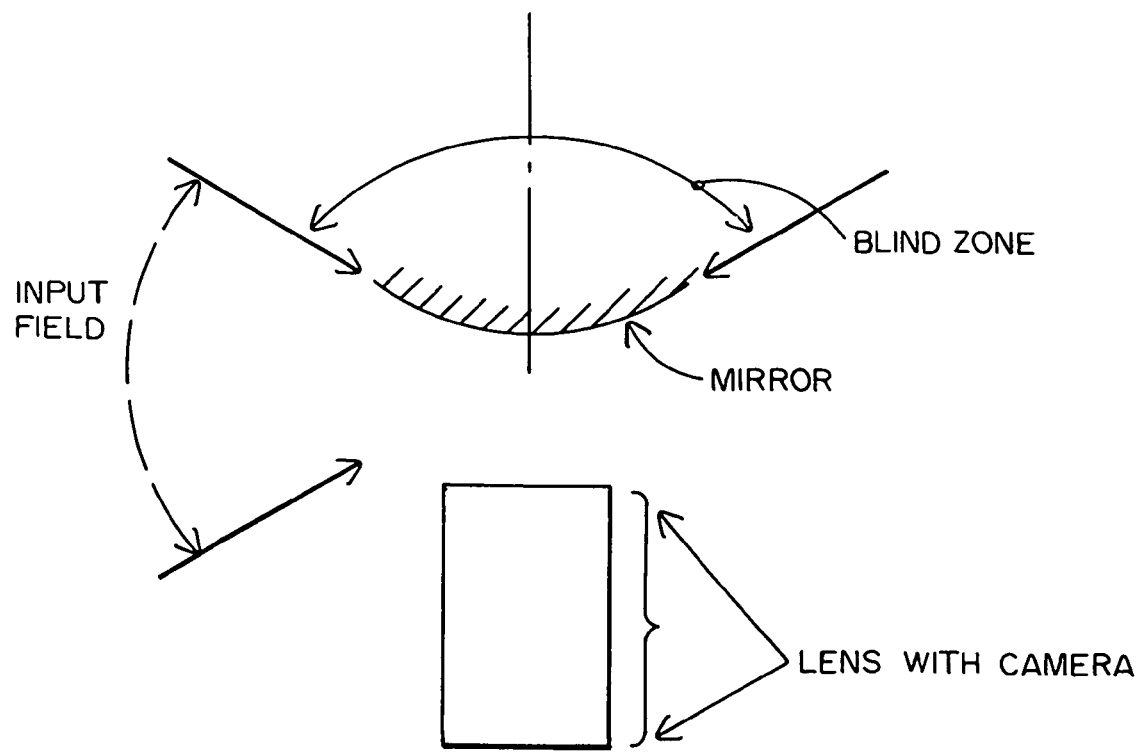
FIGS. 25 and 26 are schematic diagrams used to explain the use of panoramic imagers as rangefinders.
Figure 26:
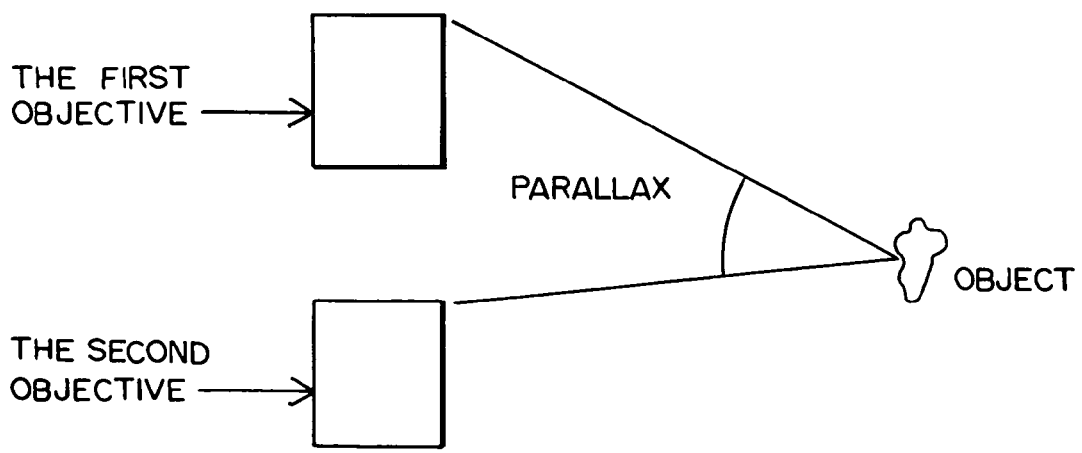

Mirror-based panoramic omnidirectional imagers have a blind zone surrounding the vertical axis (see FIG. 25). Consequently, two such imagers can be positioned along the same vertical axis, one above the other, without any mutual obscuration of the fields of view. This use of two such imagers produces a stereo effect and provides an ability to retrieve the distance to an object based upon parallax angle measurement (see FIG. 26).

Panoramic Imager with Zoom

Figure 27:
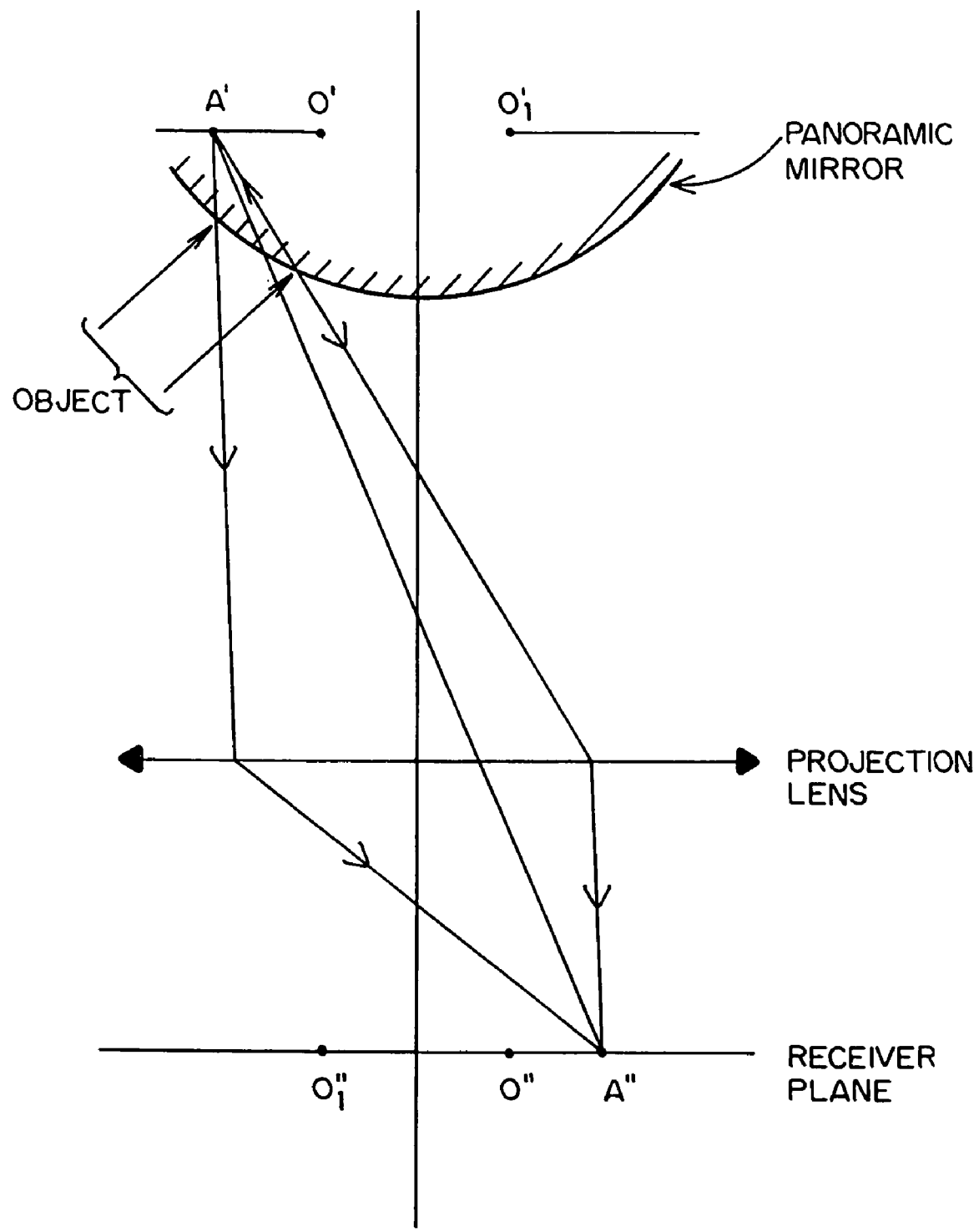
FIGS. 27 and 28 are schematic diagrams used to explain the addition of zoom function to a panoramic imager.
Figure 28:
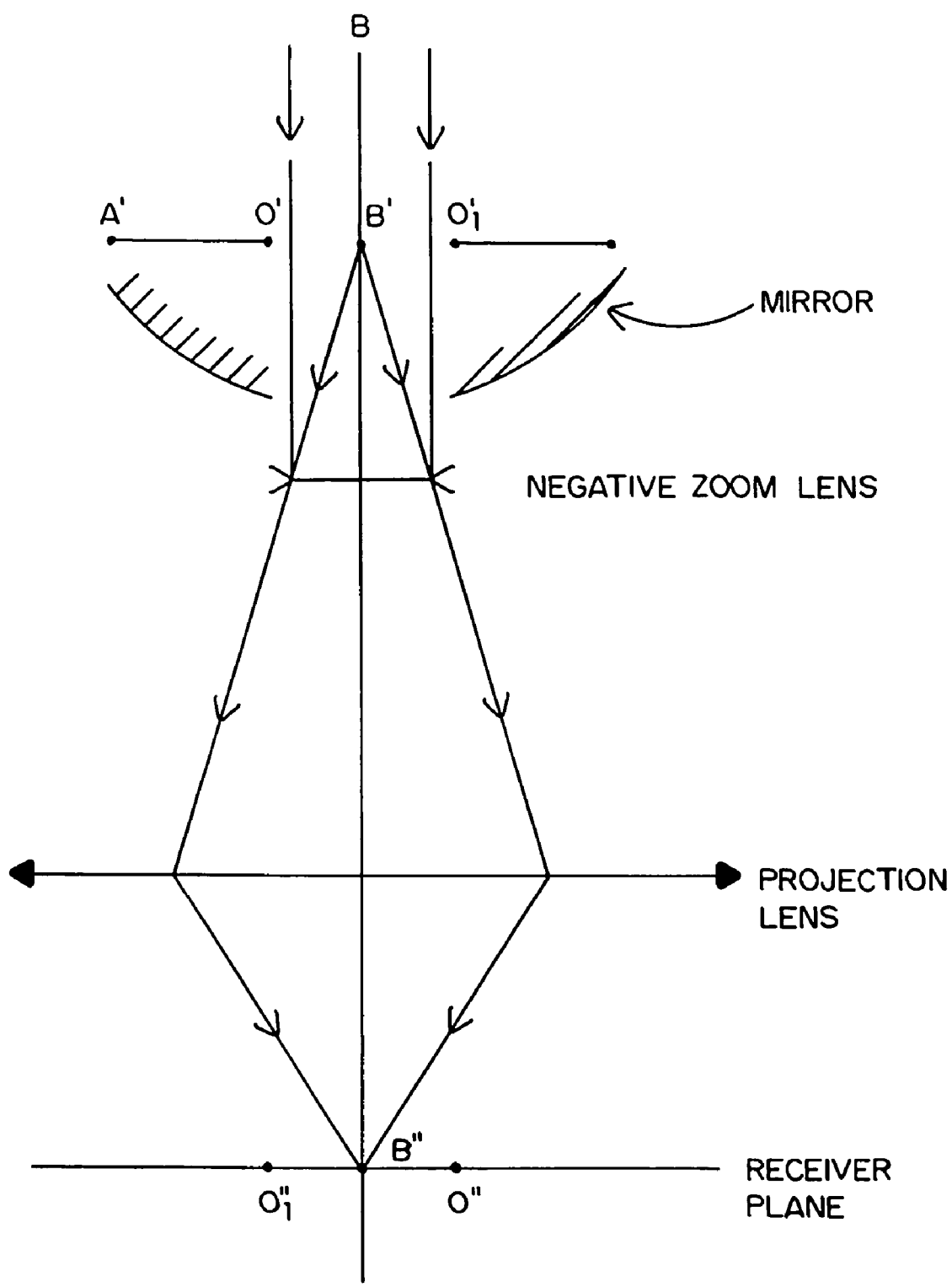

Mirror-based panoramic imagers form an image in two steps. In the first step the omnidirectional object space is transferred into an imaginary intermedial ring image above the mirror (see image A' of FIG. 27). In the second step the projection lens transfers the imaginary intermedial image to the real image at the receiver plane (see image A" of FIG. 27). Zone 0'0 can be used for the direct view of the upper field zone with zoom ability. An additional lens (negative zoom lens of FIG. 28) creates an imaginary image of the upper conical object field at the plane 0'0, of FIG. 28. Then a projection lens fills zone 0"0", at the receiver plane with the real image of the intermedial image.

Having thus disclosed preferred embodiments to illustrate the various unique features of the invention, it will now be apparent that a panoramic video system according to the present invention may be implemented in various ways, some of which are not necessarily described herein. Therefore, the scope hereof is not to be limited to the specific disclosed embodiments, but only by the appended claims and their equivalents.

We claim:

1. A method of providing a real-time panoramic video image in a rectangular format; the method comprising the steps of:
   a) providing a panoramic annular lens system to capture a 360° viewed annular image;
   b) focusing said 360° viewed annular image on a video camera image plane;
   c) transferring a data signal output of said camera image plane to a personal computer;
   d) utilizing said personal computer to unwrap said annular image into a substantially distortion free rectangular image at a rate of at least 30 fps; and
   e) presenting said rectangular image on a visual display; and
   wherein step d) comprises the steps of utilizing radiometric ray tracing to first convert said annular image to a distorted unwrapped image and then to convert said distorted unwrapped image to an undistorted unwrapped image.

2. A method of providing a real-time panoramic video image in a rectangular format; the method comprising the steps of:
   a) providing a panoramic annular lens system to capture a 360° viewed annular image;
   b) focusing said 360° viewed annular image on a video camera image plane;
   c) transferring a data signal output of said camera image plane to a personal computer;
   d) utilizing said personal computer to unwrap said annular image into a substantially distortion free rectangular image at a rate of at least 30 fps; and
   e) presenting said rectangular image on a visual display; and
   wherein step d) comprises the step of employing a vertex-based transformation using graphics processing units of said personal computer.

3. The method recited in claim 2 wherein in step a) providing said panoramic annular lens system comprises the step of providing a hyperboloidal lens and ellipsoidal mirror.

4. The method recited in claim 2 wherein in step b) providing said video camera comprises the step of providing a CCD image plane.

5. The method recited in claim 2 wherein in step b) providing said video camera comprises the step of providing CMOS image plane.

6. The method recited in claim 2 wherein step d) comprises the step of using at least one graphics card of said personal computer to unwrap said annular image.

7. An apparatus for providing a real-time panoramic video image in a rectangular format; the apparatus comprising:
   a panoramic annular lens system configured for capturing 360° viewed annular image;

a video camera having an image plane for receiving said annular image and generating a corresponding data signal output;

a computer receiving said data signal output;

a graphics card and at least one software module in said computer for unwrapping said data signal output from an annular image into a substantially undistorted rectangular image at a rate of at least 30 fps; and a visual display for displaying said rectangular image;

wherein said software module has a program for radiometric ray tracing to first convert said annular image to a distorted unwrapped image and then to convert said distorted unwrapped image to an undistorted unwrappen image.

8. An aparatus for providing a real-time panoramic video image in a rectangular format; the apparatus comprising:

a panoramic anular lens system configured for capturing 360° viewed annular image;

a video camera having an image plane for receiving said annular image and generating a corresponding data signal output;

a computer receiving said data signal output;

a graphics card and at least one software module in said computer for unwrapping said data signal output from an annular image into a substantially undistorted rectangular image at a rate of at least 30 fps; and a visual display for displaying said rectangular image; and wherein said software module has a program for vertex-based transformation for unwrapping said annular image.

9. The apparatus recited in claim 8 further comprising means for capturing said data signal output; means for converting said video image from said data signal output; means for manipulating said converted video image; and means for rendering said image in a Cartesian format.

10. The apparatus recited in claim 8 wherein said panoramic annular lens system has a hyperboloidal lens and an ellipsoidal mirror.

11. The apparatus recited in claim 8 wherein said video camera has a COD imaging plane.

12. The apparatus recited in claim 8 wherein said vide camera has a CMOS imaging plane.

13. A panoramic video system having real-time distortion-free imaging; the system comprising:

a panoramic optical system having at least one optical element for viewing a 360° field of view and focusing a corresponding image on an image plane;

a video camera having a sensing element at said image plane for converting said image into a corresponding video signal;

a computer receiving said video signal and having at least one graphics processing unit employing a vertex-based transformation program for configuring a substantially distortion-free rectangular display of said image at a rate of at least 30 fps; and a monitor for presenting said display.

14. The panoramic video system of claim 13 wherein said optical system optical element comprises an annular element and said corresponding image is an annular image of said 360° field of view.

15. The panoramic video system of claim 13 wherein said video camera comprises a CCD sensing element.

16. The panoramic video system of claim 13 wherein said video camera comprises a CMOS sensing element.

17. The panoramic video system of claim 13 wherein said video camera sensing element has a pixel resolution of at least 1280×1024.

18. The panoramic video system of claim 13 wherein said video camera sensing element has a pixel resolution of at least 720×480.

19. The panoramic video system of claim 13, said computer comprising at least one graphics card for configuring said rectangular display.

* * * * *